United States Patent
Agrawal (10) Patent No.: US 9,223,756 B2
(45) Date of Patent: Dec. 29, 2015

(54) METHOD AND APPARATUS FOR IDENTIFYING LOGICAL BLOCKS OF TEXT IN A DOCUMENT

(71) Applicant: Adobe Systems Inc., San Jose, CA (US)

(72) Inventor: Ram Bhushan Agrawal, Noida (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 301 days.

(21) Appl. No.: 13/800,242

(22) Filed: Mar. 13, 2013

(65) Prior Publication Data
US 2014/0281939 A1    Sep. 18, 2014

(51) Int. Cl.
*G06F 17/21*    (2006.01)

(52) U.S. Cl.
CPC ...................... *G06F 17/21* (2013.01)

(58) Field of Classification Search
None
See application file for complete search history.

(56) References Cited

U.S. PATENT DOCUMENTS

| | | | |
|---|---|---|---|
| 5,335,290 A * | 8/1994 | Cullen et al. | 382/176 |
| 6,144,974 A | 11/2000 | Gartland | |
| 6,336,124 B1 | 1/2002 | Alam et al. | |
| 7,756,333 B2 | 7/2010 | Blackmon et al. | |
| 8,060,513 B2 | 11/2011 | Basco et al. | |
| 8,245,131 B2 | 8/2012 | Chao et al. | |
| 8,249,344 B2 | 8/2012 | Viola et al. | |
| 2006/0155700 A1 * | 7/2006 | Dejean et al. | 707/6 |
| 2007/0136660 A1 * | 6/2007 | Gurcan et al. | 715/513 |
| 2010/0174985 A1 * | 7/2010 | Levy et al. | 715/244 |
| 2013/0174017 A1 * | 7/2013 | Richardson et al. | 715/234 |
| 2013/0223743 A1 * | 8/2013 | Deryagin et al. | 382/180 |

FOREIGN PATENT DOCUMENTS

WO    WO2014005609 A1 *    1/2014

OTHER PUBLICATIONS

Minh-Thang Luong et al., "Logical Structure Recovery in Scholarly Articles with Rich Document Features", 25 pgs.

\* cited by examiner

*Primary Examiner* — Stephen Hong
*Assistant Examiner* — Sanchita Roy
(74) *Attorney, Agent, or Firm* — Keller Jolley Preece (57) ABSTRACT

A computer implemented method and apparatus for identifying logical blocks of text in a document where document structure information is absent. The method comprises accessing a document, wherein the document comprises a plurality of words; identifying word information for each word in the plurality of words; creating a plurality of text lines based on the word information, wherein each text line in the plurality of text lines comprises one or more words in the plurality of words; and creating a plurality of text blocks derived from the plurality of text lines.

20 Claims, 4 Drawing Sheets

METHOD AND APPARATUS FOR IDENTIFYING LOGICAL BLOCKS OF TEXT IN A DOCUMENT

BACKGROUND OF THE INVENTION

1. Field of the Invention

Embodiments of the present invention generally relate to document editing and, more particularly, to a method and apparatus for identifying logical blocks of text in a document where document structure information is absent.

2. Description of the Related Art

Document editing is a common task among computer users. Software editors use a document's structure information to display a document in edit mode. An editing feature divides the text on a page into logical blocks, such as paragraphs, table cells, list items, and the like using the document's structure information. However, in the absence of document structure information, the editing feature cannot identify logical blocks of the text in a page.

Currently, with position-based text layout information, the logical blocks are created for editing on an ad-hoc basis derived from the way text objects are constructed inside the document on a line-by-line basis, which requires extensive time and effort.

Therefore, there is a need for a method and apparatus for identifying logical blocks of text in a document where document structure information is absent.

SUMMARY OF THE INVENTION

A method and apparatus for identifying logical blocks of text in a document where document structure information is absent substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

While the method and apparatus is described herein by way of example for several embodiments and illustrative drawings, those skilled in the art will recognize that the method and apparatus for identifying logical blocks of text in a document where document structure information is absent is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for identifying logical blocks of text in a document where document structure information is absent defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention comprise a method and apparatus for identifying logical blocks of text in a document where document structure information is absent. Document structure information is hierarchical information about physical components of the document, such as pages, columns, paragraphs, text lines, words, tables, figures, and the like. Document structure information may also be hierarchical information about logical components of a document, such as titles, authors, abstracts, sections, and the like. For example, a WORD® document contains all of the necessary structural information inside its format so a word processor, such as MICROSOFT® WORD® may allow it to be easily edited. In contrast, a notepad file contains basic structure information, such as a sequence of words, line breaks, paragraph breaks, and the like, but does not contain rich information about document structure. Embodiments of the invention extract each word from a document, combine the words into lines, and then combine the lines into logical blocks of text in order to reconstruct the document.

Various embodiments of a method and apparatus for identifying logical blocks of text in a document where document structure information is absent are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 1:
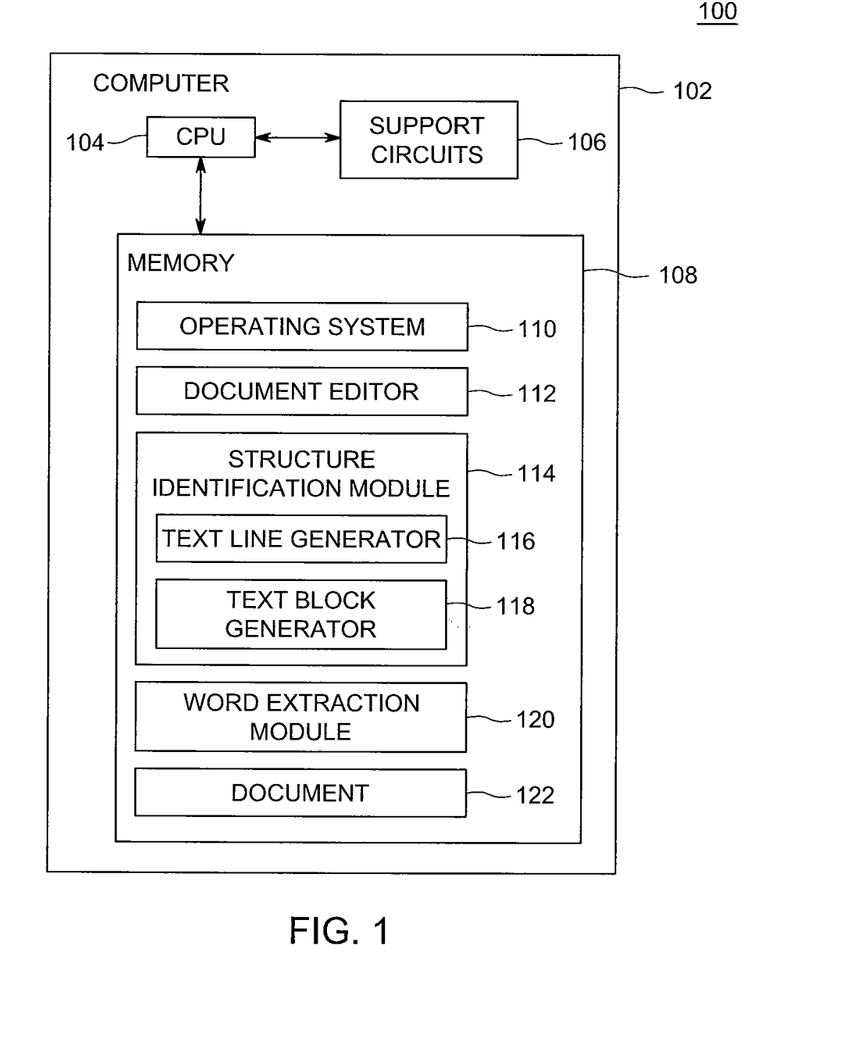
FIG. 1 is a block diagram of an apparatus for identifying logical blocks of text in a document where document structure information is absent, according to one or more embodiments.

FIG. 1 is a block diagram of an apparatus 100 for identifying logical blocks of text in a document where document structure information is absent, according to one or more embodiments. The apparatus 100 identifies individual words of the document. The apparatus combines them into a plurality of lines and then combines the plurality of lines into logical blocks. The logical blocks are then made available to a document editor. The system 100 includes a computer 102. The computer 102 includes a Central Processing Unit (CPU) 104, support circuits 106, and a memory 108. The CPU 104 may include one or more commercially available microprocessors or microcontrollers that facilitate data processing and storage. The various support circuits 106 facilitate the operation of the CPU 104 and include one or more clock circuits, power supplies, cache, input/output circuits, and the like. The memory 108 includes at least one of Read Only Memory (ROM), Random Access Memory (RAM), disk drive storage, optical storage, removable storage and/or the like.

The memory 108 includes an operating system 110, a document editor 112, a structure identification module 114, a word extraction module 120, and a document 122. The structure identification module 114 includes a text line generator and a text block generator. The operating system 110 may include various commercially known operating systems. The document editor 112 may be any document editor, such as ADOBE® ACROBAT®, and the like. The word extraction module 120 may be any word extraction software, such as ADOBE® PDWordFinder API.

When a document 122 absent document structure information is opened for editing, the structure identification module 114 uses the word extraction module 120 to extract information regarding each word of the document 122, including the position of each word and the text of the word in Unicode string format. The text line generator 116 reads each word one-by-one and based on a set of rules, determines whether words are joined on the same line or whether a new line should be started. The text line generator 116 then evaluates the generated text lines based on a set of criteria. The text block generator 118 access the generated text lines and determines whether lines should be merged into the same text block or whether a new block should be created based on a set of rules. The text block generator 118 then determines if text blocks should be broken into smaller blocks, repairs text blocks that are interfering with one another and finally performs an analysis to identify justification of the text blocks. The result comprises an identification and creation of logical text blocks of a document.

Figure 2:
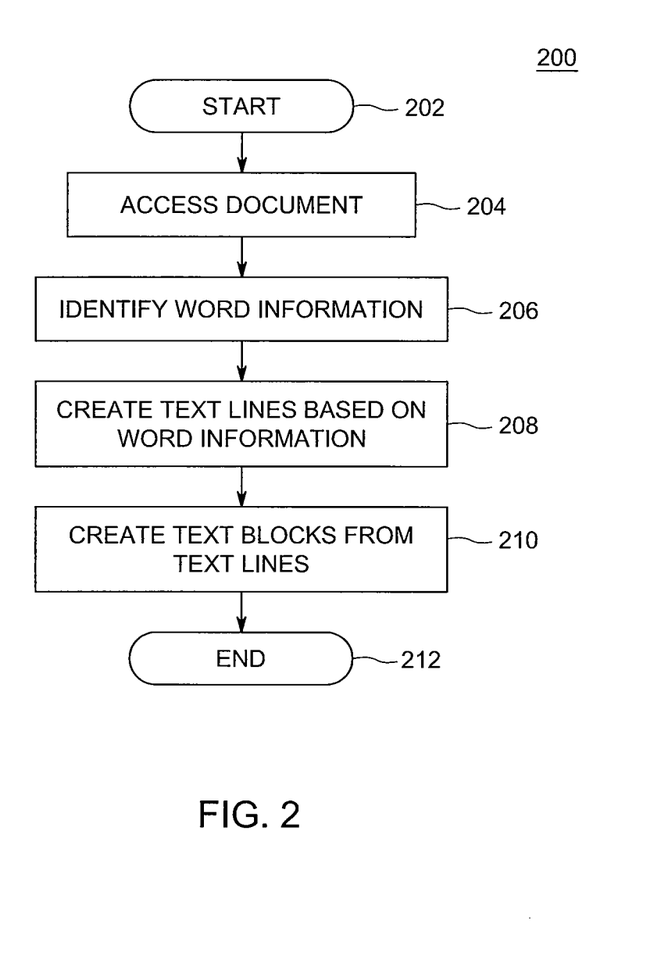
FIG. 2 depicts a flow diagram of a method for identifying logical blocks of text in a document where document structure information is absent, as performed by the structure identification module of FIG. 1, according to one or more embodiments.

FIG. 2 depicts a flow diagram of a method 200 for identifying logical blocks of text in a document where document structure information is absent, as performed by the structure identification module of FIG. 1, according to one or more embodiments. The method 200 identifies individual words of a document, combines them into lines and from the lines combines them into logical text blocks.

The method 200 starts at step 202 and proceeds to step 204. At step 204, the method 200 accesses a document. The document may have any position-based text layout format. A position-based text layout is one where the information of each text entity, such as a character, word, group of words, and the like, is available based on its spatial position. In some embodiments, the spatial position is based on an x,y coordinate system. However, the document does not have any information about document structure. For example, the document may be an untagged PDF containing text, a scaled document image where optical character recognition (OCR) has been performed and OCR results are available with the spatial position of the text, an illustrator file with text, and AUTOCAD® drawing with text, and the like.

The method 200 proceeds to step 206, where the method 200 identifies information about each word of the document. The word information contains the position of the word extent in x,y coordinates within the document and the text of the word in Unicode string format. The word extent may be defined using the x,y coordinates of the top left pixel of the word and the x,y coordinates of the bottom right pixel of the word. The method 200 proceeds to step 208, where the method 200 creates text lines containing the text of one or more words based on the word information, as described in further detail with respect to FIG. 3 below. The method 200 proceeds to step 210, where the method 200 creates text blocks from the text lines, as described in further detail with respect to FIG. 4 below. The method 200 proceeds to step 210 and ends.

Figure 3:
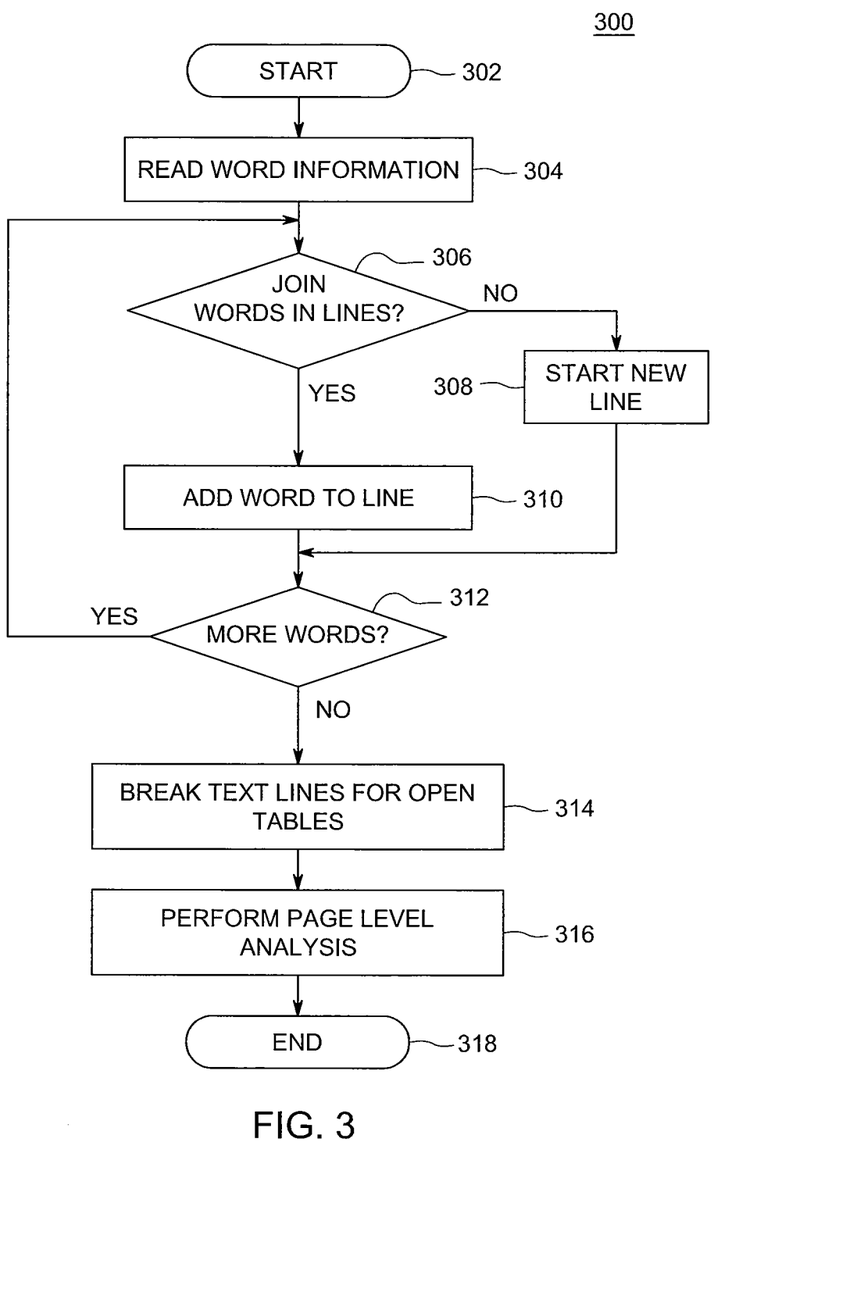
FIG. 3 depicts a flow diagram of a method for creating text as performed by the text line generator of FIG. 1, according to one or more embodiments.

FIG. 3 depicts a flow diagram of a method 300 for creating text lines as performed by the text line generator of FIG. 1, according to one or more embodiments. The method 300 reads the words one by one and creates lines from the words based on criteria. The method 300 starts at step 302 and proceeds to step 304.

At step 304, the method 300 reads the identified word information for each word at step 206 above. The first word begins the first line. The method 300 proceeds to step 306. For each word after the first word, the method 300 determines whether the word should be combined with the other words in the text line.

If any of the following conditions are met, the method 300 determines that the word should not be joined with the other words on the text line. If the word looks like a list label (e.g., the word includes a bullet point), the word should not be joined. Bullet point characters are identified by comparing the Unicode value of the word with a predefined table of bullet characters. The method 300 also evaluates layout based criteria, such as whether the word is at the beginning of a line, wither the word is a single character, and the like. If the word is not on the same reading line as an immediately previous word, meaning the y position center of the previous word is not within the y extents of the current word, the word should not be joined.

Two words are not joined if a horizontal gap between them is greater than a threshold, wherein the threshold is determined based on a determined average height of the words. A vertical gap is the vertical distance between a bottom of a first line and a top of a second line. The average vertical gap is calculated for a page of a document. Gaps exist between text lines in a document, but large gaps also exist between paragraphs and between the last paragraph and a page number. The large gaps may skew the average. Typically, a gap between text lines of a document are less than or equal to 2.5*h, where h is the height of the line. Any gap that is greater than 2.5*h is considered an outlier and not used in the calculation of the average vertical gap.

Two words are not joined if their relative heights differ beyond a ratio threshold. However, if the relative position of a current word with respect to the immediately previous word suggests it to be superscript or subscript, then this criterion may be omitted. Two words are not joined if there exists a vertical line between them, indicating the words are text in different cells of a bordered table. If the immediately previous word is the beginning of a line and the previous word contains a single character with a large font size compared to the current word, the previous word is treated as a drop cap character and the current word is not joined with it. A drop character is a large sized character that typically starts an article or a section of a magazine. A drop character is used for aesthetic purposes. If any of these conditions are met, the method 300 determines that the word should not be joined with the other words on the text line and the method 300 proceeds to step 308, where the method 300 starts a new text line. The method 300 proceeds to step 312.

However, if at step 306, none of the above conditions were met, the method 300 determines that the word should be joined with other words in the text line. For example, conditions where the word should be joined with other words in the text line include: if the word is a text word, if the word contains mostly digits (however a flag may be saved for future use upon this condition), or if the word contains a sequence of dot (.) characters, suggesting the word may be part of a table of contents. The method 300 proceeds to step 310, where the method 300 joins the word on the line with the other words on the text line. The method 300 proceeds to step 312.

At step 312, the method 300 determines whether there are other words to evaluate in the document. If the method 300 determines there are more words to evaluate, the method 300 proceeds to step 306, where the method 300 iterates until all words in the document have been evaluated and the method 300 proceeds to step 314.

At step 314, the method 300 breaks text lines that are determined to be open tables. Open tables are tables that do not have borders around cells of the table. The method 300 analyzes each text line. If a text line contains more than a pre-defined threshold of words that are numbers, the method 300 determines that the words of the text line are entries in an open table and breaks the words of the text line into individual text lines. When all text lines have been evaluated, the method 300 sorts the text lines in lexicographic order, for example, from left to right and top to bottom. The method 300 proceeds to step 316.

At step 316, the method 300 performs a page-level analysis to adaptively calculate various thresholds. The method 300 calculates an average for text line heights and averages for vertical gaps between successive lines. While performing these calculations, the method 300 discards any outliers as described previously with respect to calculating an average horizontal gap. The averages are then used to adjust thresholds used by method 400 in FIG. 4. The method 300 proceeds to step 318 and ends.

Figure 4:
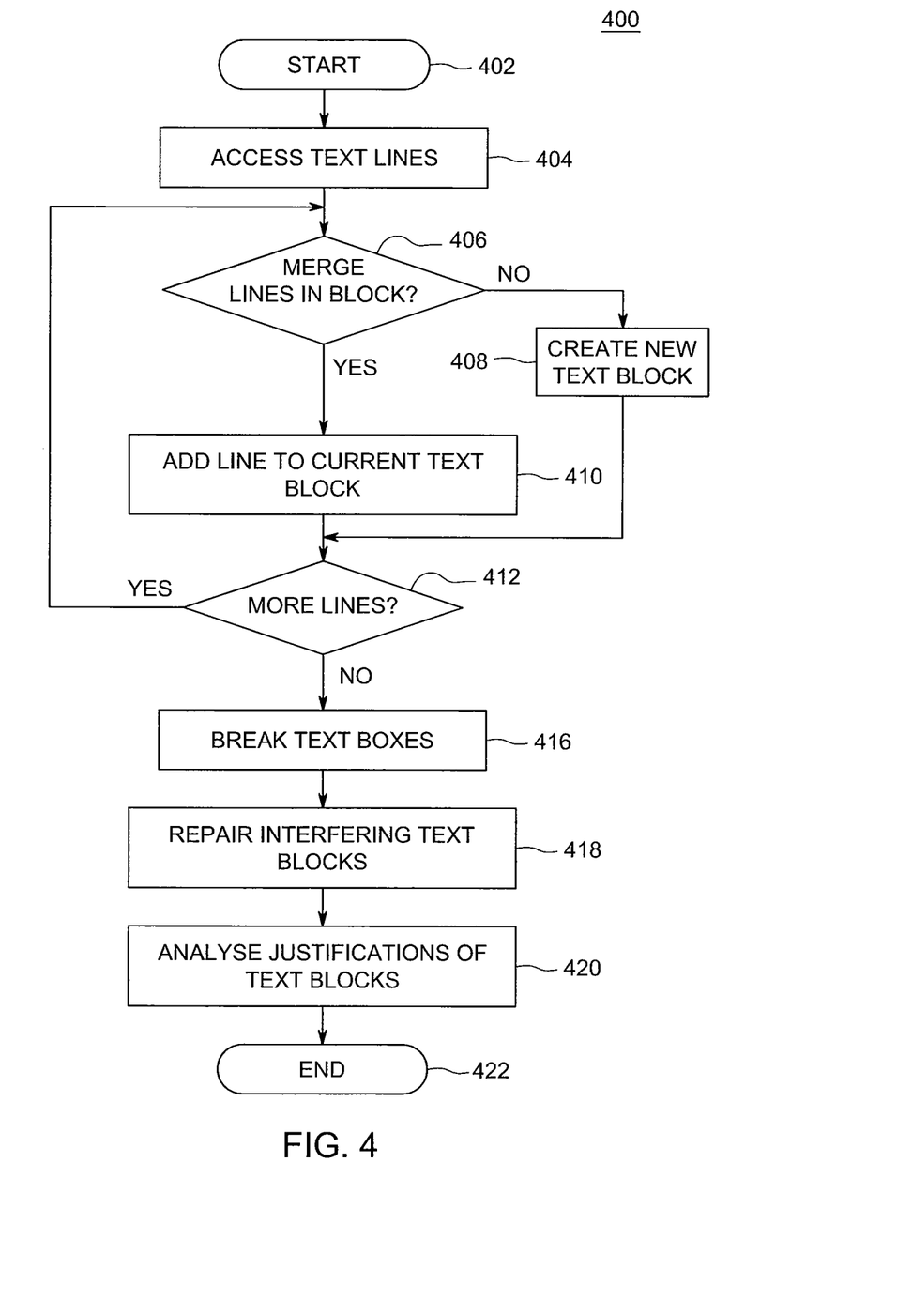
FIG. 4 depicts a flow diagram of a method for creating text blocks as performed by the text block generator of FIG. 1, according to one or more embodiments.

FIG. 4 depicts a flow diagram of a method 400 for creating text blocks as performed by the text block generator of FIG. 1, according to one or more embodiments. The method 400 reads the text lines one by one and determines whether text lines should be joined to create logical text blocks based on criteria. The method 400 then refines the logical text blocks to identify and create a set of logical text blocks for the document. The method 400 starts at step 402 and proceeds to step 404.

At step 404, the method 400 accesses the sorted text lines generated by method 300 above. The method 400 proceeds to step 406. At step 406, the method 400 determines whether the current text line should be joined with a text block or if a new text block should be created. The method 400 evaluates all of the text blocks until a block is found with which to merge the current text line. If no text block is found with which to merge the current text line, a new text block is created.

Conditions where the text line should not be joined with a text block include the following. If the current line is a list label, a list item or a drop cap (large initial letter), the text line is not joined. If the current line is part of a table of contents, the line is not joined. If the current line is part of an open table, the line is not joined. If the current line height differs from the immediately previous text line by a calculated threshold, the line is not joined. If the current line is on the same reading line as the immediately previous text line, then the line is not joined. If the vertical gap between the current line and the immediately previous text line exceeds a calculated threshold, the line is not joined. If the current line does not have some common horizontal span with the immediately previous text line, the line is not joined. If a horizontal vector line exists between the current text line and the immediately previous text line, the method 400 determines that the lines are part of different cells of a bordered table, and the line is not joined. If the method 400 determines the current line should not be joined with a text block, the method 400 proceeds to step 408, where the method 400 creates a new text block. The method 400 proceeds to step 412.

However, if at step 406, none of the conditions apply that would cause the current text line not to be joined with the current text block, the method 400 determines that the current text line should be merged with the current text block and the method 400 proceeds to step 410, where the method 400 adds the text line to the current text block and the method 400 proceeds to step 412.

At step 412, the method 400 determines whether there are more text lines to be evaluated. If the method 400 determines that there are more text lines to be evaluated, the method 400 proceeds to step 406, where the method 400 iterates until all text line have been evaluated at which time the method 400 proceeds to step 416.

At step 416, the method 400 evaluates each text block and breaks the text blocks into smaller text blocks based on the following criteria. If the width of a text block is below a pre-defined threshold, the method 400 assumes that the block is formed by a column of an open or a hybrid table and the method 400 breaks the block into single lines. If the width of the block is not below the threshold, the method 400 analyzes the vertical gap between the text lines. The method 400 calculates a critical row separation (CRS) threshold. Line pairs having line separation less than the CRS are considered to be part of the same paragraph, but line pairs having line separation greater than the CRS are considered to be part of a new paragraph. For example, a single text block may be broken into three text blocks (i.e., three paragraphs) based on the CRS.

The method 400 proceeds to step 418, where the method 400 repairs interfering text blocks. The method 400 compares all pairs of text blocks to determine if the two blocks are interfering with one another (i.e., the content of one block partially or fully lays within the bounds of another block). Based on the properties of the text block pairs and how they interact, the blocks may need to be merged or broken down further based on the following criteria. If one block is fully contained within another block, the method 400 merges the smaller block into the larger block. However, if the smaller block is a list item, list label, drop cap, or potential table cell, the block is not merged and the interfering blocks are broken down until the interference is removed.

The method 400 proceeds to step 420, where the method 400 analyzes each text block and applies justification (e.g., left-justified, right-justified, centered, etc.) based of the following criteria.

If the block contains only a single line, then the block is classified as left-justified and the step 420 evaluates the next text block. If the layout in the text box is fully-justified, meaning the text lines that make up the text block start at the same position and end at the same position, the text box is classified as fully-justified. In the case of fully-justified text lines, the first text line may be indented and the last text line may end at a different position. The step 420 evaluates the next text block.

If the text lines of the text block have their center points aligned on a vertical line, the text block is classified as center justified and the method 400 evaluates the next text block. If the text block is left-justified, meaning the text lines start at the same position, regardless of where the text lines end, then the text block is classified as left-justified and the step 420 evaluates the next text block.

If the text block is right-justified, meaning the text lines end at the same position, regardless of where the text lines begin, then the text block is classified as right-justified and the step 420 evaluates the next text block.

If none of the previous criteria is met, the step 420 evaluates if the text block contains multiple paragraphs, separated only by a first line indent and no paragraph spacing. If so, the step 420 breaks the text block into separate paragraphs. Otherwise, the step 420 determines if there is a steep change in left or right margins. A steep change in margins indicates that the text is wrapping around images and the step 420 breaks the text block at the identified margin changes.

Lastly, if none of the above conditions apply, the step 420 creates a text block by breaking off the first text line of the text block. The remaining text block (i.e., the text block with the first text line removed) is then re-evaluated separately for justification analysis. When all text blocks have been evaluated, the method 400 proceeds to step 422 and ends.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
accessing a document, wherein the document comprises a plurality of words;
calculating a threshold horizontal gap between words based only on the average vertical height of the plurality of words, wherein horizontal and vertical are orthogonal directions within the document;
creating a plurality of text lines from the plurality of words based on the threshold horizontal gap between words based on the average vertical height of the plurality of words, wherein each text line in the plurality of text lines comprises one or more words in the plurality of words; and
creating a plurality of text blocks derived from the plurality of text lines.

2. The method of claim 1, further comprising:
repairing interfering text blocks in the plurality of text blocks by merging text blocks when a first text block comprises a second text block; and
identifying justification alignment of each text block in the plurality of text blocks.

3. The method of claim 1, wherein the document comprises a position-based text layout format and lacks document structure information.

4. The method of claim 1, further comprising identifying a position of word extents in an x,y coordinate plane and one or more Unicode characters representing a text of the word.

5. The method of claim 1, wherein creating a plurality of text lines comprises comparing information about a current word with information about an immediately previous word, wherein the information comprises at least one of word information of the current word and the immediately previous word, a position of each word in the document, or a difference in relative heights of the words.

6. The method of claim 1, wherein creating a plurality of text blocks comprises comparing information about a current text line with information about an immediately previous text line, wherein the information comprises at least one of a difference in relative heights of the current text line and the immediately previous text line, a size of a vertical gap between the current text line and the immediately previous text line, word information of the words in the current text line, or a horizontal vector line between the current text line and the immediately previous text line.

7. The method of claim 1, wherein creating the plurality of text lines from the plurality of words comprises:
searching the document for one or more drop cap characters, one or more list labels, one or more list items, one or more superscripts, or one or more vertical lines between words; and
identifying words to include in one or more of the plurality of text lines based on the results of the search for the one or more drop cap characters, the one or more list labels, the one or more list items, the one or more superscripts, or the one or more vertical lines between words.

8. The method of claim 1, wherein creating a plurality of text blocks from the plurality of text lines further comprises:
identifying a number of numerical digits in one or more text lines;
searching for one or more horizontal lines between text lines, one or more list labels, one or more list items, or one or more drop cap characters;
comparing the width of at least one text block to a pre-determined width threshold; and
identifying lines to include in one or more of the plurality of text blocks based on:
the identified number of numerical digits in a text line;
the results of the search for the one or more horizontal line between two text lines, the one or more list labels, the one or more list items, or the one or more drop cap characters; and
the comparison between the width of the at least one text block and the pre-determined width threshold.

9. A system comprising:
at least one processor; and
at least one non-transitory computer readable storage medium storing instructions thereon that, when executed by the at least one processor, cause the system to:
identify a plurality of text blocks in a document, wherein the document comprises a plurality of words;
calculate the average vertical height of the plurality of words, wherein horizontal and vertical are orthogonal directions within the document;
set a threshold horizontal gap equal to the calculated average vertical height of the plurality of words;
create a plurality of text lines from the plurality of words based on the threshold horizontal gap between words based on the average vertical height of the plurality of words, wherein each text line in the plurality of text lines comprises one or more words in the plurality of words; and
create a plurality of text blocks based on the plurality of text lines.

10. The system of claim 9, wherein the document comprises a position-based text layout format and lacks document structure information.

11. The system of claim 9, further comprising instructions stored thereon that, when executed by the at least one processor, cause the system to identify a position of word extents in an x,y coordinate plane and one or more Unicode characters representing a text of the word.

12. The system of claim 9, wherein the instructions stored thereon that, when executed by the at least one processor, cause the system to:
create text lines by comparing information about a current word with information about an immediately previous word, wherein the information comprises at least one of word information of the current word and the immediately previous word, a position of each word in the document, or a difference in relative heights of the words, and
create text blocks by comparing information about a current text line with information about an immediately previous text line, wherein the information comprises at least one of a difference in relative heights of the current text line and the immediately previous text line, a size of a vertical gap between the current text line and the immediately previous text line, word information of the words in the current text line, or a horizontal vector line between the current text line and the immediately previous text line.

13. A non-transitory computer readable medium for storing computer instructions that, when executed by at least one processor cause the at least one processor to:
access a document, wherein the document comprises a plurality of words;
calculate a threshold horizontal gap between words based only on the average vertical height of the plurality of words, wherein horizontal and vertical are orthogonal directions within the document;

create a plurality of text lines from the plurality of words based on the threshold horizontal gap between words based on the average vertical height of the plurality of words, wherein each text line in the plurality of text lines comprises one or more words in the plurality of words; and create a plurality of text blocks derived from the plurality of text lines.

14. The non-transitory computer readable medium of claim 13, further comprising computer instructions that, when executed by at least one processor, cause the at least one processor to:

correct interfering text blocks in the plurality of text blocks; and identify justification alignment of each text block in the plurality of text blocks.

15. The non-transitory computer readable medium of claim 13, wherein the document comprises a position-based text layout format and lacks document structure information.

16. The non-transitory computer readable medium of claim 13, further comprising instructions thereon that, when executed by the at least one processor, cause the at least one processor to identify a position of word extents in an x,y coordinate plane and one or more Unicode characters representing a text of the word.

17. The non-transitory computer readable medium of claim 13, wherein the computer instructions, when executed by at least one processor, cause the at least one processor to create text lines by comparing information about a current word with information about an immediately previous word, wherein the information comprises at least one of word information of the current word and the immediately previous word, a position of each word in the document, or a difference in relative heights of the words.

18. The non-transitory computer readable medium of claim 13, wherein the computer instructions, when executed by at least one processor, cause the at least one processor to create text blocks by comparing information about a current text line with information about an immediately previous text line, wherein the information comprises at least one of a difference in relative heights of the current text line and the immediately previous text line, a size of a vertical gap between the current text line and the immediately previous text line, word information of the words in the current text line, or a horizontal vector line between the current text line and the immediately previous text line.

19. The non-transitory computer readable medium of claim 14, wherein the computer instructions, when executed by at least one processor, cause the at least one processor to correct interfering text blocks by merging text blocks when a first text block comprises a second text block and splitting a text block into two or more smaller text blocks to remove the interference.

20. The non-transitory computer readable medium of claim 14, wherein the computer instructions, when executed by at least one processor, cause the at least one processor to justify alignment by classifying a text block as right-justified, left-justified, fully-justified, or centered, or splitting a text block into two or more smaller text blocks when a steep change a left or right margin of the text block or a plurality of paragraphs is identified.

* * * * *